Dec. 31, 1929.                     W. D. KELLY                    1,742,083
                                   ELECTRIC HEATER
                                Filed March 21, 1925
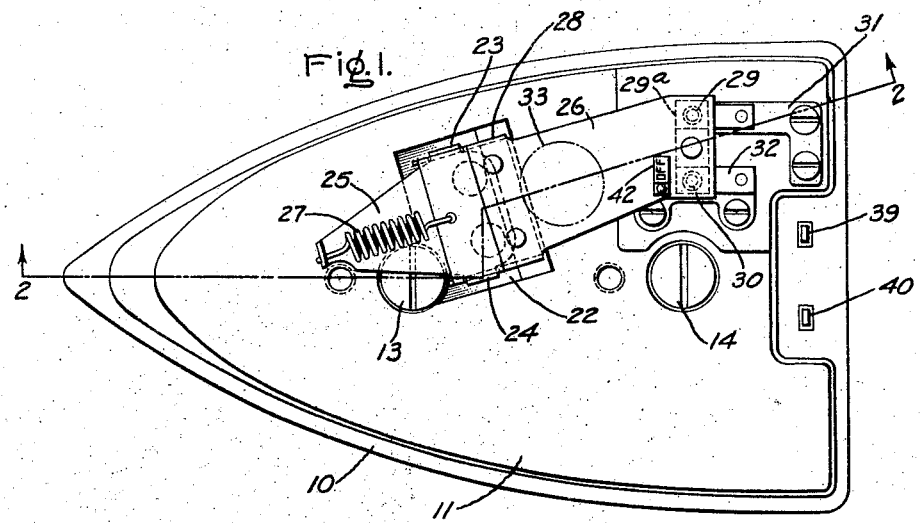
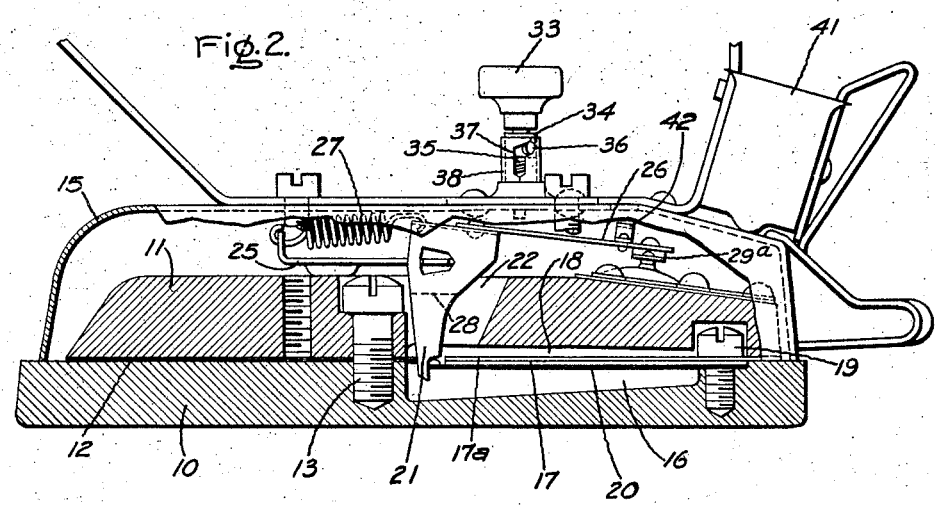
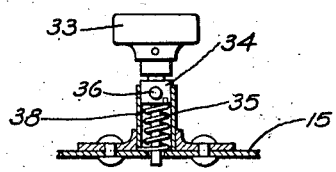
Inventor:
William D. Kelly,
by *[signature]*
His Attorney.

Patented Dec. 31, 1929

1,742,083

UNITED STATES PATENT OFFICE

WILLIAM D. KELLY, OF WESTERN SPRINGS, ILLINOIS, ASSIGNOR TO EDISON ELECTRIC APPLIANCE COMPANY, INCORPORATED, OF CHICAGO, ILLINOIS, A CORPORATION OF NEW YORK

ELECTRIC HEATER

Application filed March 21, 1925. Serial No. 17,396.

My invention relates to electric heaters and has for its object the provision of a simple and reliable temperature cut-out for electric heaters.

Although it obviously has other applications, my invention is particularly useful in the protection of electrically heated appliances, such as flatirons.

In carrying out my invention, I provide a switch in the circuit of the electric heater, which switch is released by distortion of a thermostat upon the occurrence of a predetermined maximum temperature whereby the heating circuit is opened. I have also provided manually operated quick closing means for the switch.

For a more complete understanding of my invention reference should be had to the accompanying drawing in which Fig. 1 is a plan view with the cover removed of an electric flatiron embodying my invention; Fig. 2 is a side elevation view mainly in section along the line 2—2 of Fig. 1, looking in the direction of the arrows; while Fig. 3 is a sectional view of the switch reclosing means.

Referring to the drawing, I have shown my invention in one form as applied to a well known type of electric flatiron comprising a sole plate 10 and a pressure plate 11 between which is clamped a suitable flat resistance heating unit 12. The two plates may be secured together by means of screws 13 and 14. The pressure plate is somewhat smaller than the sole plate and is enclosed by a cover 15 which rests on the sole plate. The cover is suitably secured to the pressure plate, for example, by means of screws (not shown).

In the upper surface of the sole plate is an elongated recess 16 in which is secured a thermostat 17. A recess 18 in the lower surface of the pressure plate registers with the recess 16 and provides greater space for the thermostat. The thermostat is in the form of a flat strip or bar of the well known bimetallic kind and is secured at one end to the sole plate by means of a screw 19. Its other end is free to move up and down in accordance with its distortion upon changes in temperature. In the arrangement shown, the free end of the thermostat will be moved downward upon an increase in temperature.

The thermostat is made up of a plurality of separate bimetallic thermostatic bars or strips 17ª, two being shown. These bars 17ª are built up on each other, i. e., placed together lengthwise, one above the other, and are secured to the sole plate 10 at one end by the screw 19. In order to obtain a better thermal relation between the bars themselves and between the bars and the heated body 10, the bars are preferably welded together at their fixed end, i. e. the end secured by the screw 19. This gives greater uniformity of heating of the bars and as a result greater uniformity of action. Throughout the remainder of their lengths the bars are mechanically independent of each other. The bars are so arranged that their free ends will move in unison upward or downward upon changes in temperature. Assembled lengthwise with the bars 17ª is a somewhat longer bar 20, made of suitable resilient metal which is adapted to withstand high temperatures, such as chromium or tungsten steel. As shown the bar 20 is underneath the bars 17ª. It is clamped at one end to the bars 17ª and secured to the sole plate by the screw 19.

Cooperating with the free end of the bar 20, which extends beyond the end of the thermostat, is an arm 21 extending upward through an aperture 22 in the pressure plate 11. This arm 21 is pivotally mounted on knife edge bearings 23 and 24 carried by a plate 25 which is secured on the pressure plate. Riveted to the upper end of the arm 21 is a laterally extending switch arm 26. The arm 21, and with it the switch arm 26, is biased about its pivot in a counter clockwise direction by means of a spring 27, also made of a heat resisting material, which has one end secured to arm 21 and its other end secured to plate 25. The switch arm 26 is made from spring steel and is flexible to aid in lining up the contacts. The arm 21 is bent over at right angles at the top to form a substantially horizontal portion to which the switch arm is secured, a shorter portion 28 being bent down on the opposite side of the switch arm to form the opposite bearing on knife edge 23.

Under normal conditions of operation, i. e. when the temperature of the flatiron is below a predetermined maximum temperature, the lower end of arm 21 rests against the projecting end of bar 20. In this position the floating bridging contacts 29 and 30 carried by the switch arm 26 are held in engagement with stationary insulated contacts electrically connected to the electrically insulated contact terminals 31 and 32, by means of which the switch formed by the cooperating bridging and stationary contacts can be connected in circuit with the heater 12. The contacts 29 and 30 are carried on the ends of a resilient bar 29$^a$ which is loosely secured at its center to the arm 26 in insulated relation therewith. With the switch arm 26 in this position, the heating circuit is closed. Upon the occurrence of a predetermined maximum temperature, the end of bar 20 will be bent downward by the thermostat until the arm 21 is released whereupon the switch arm is thrown upward by the spring 27 to open the heating circuit.

The flatiron will now cool off. It will be observed, however, that the thermostat formed by the bars 17$^a$ is free to bend upward as it cools and assume its original position independently of bar 20 which is held down under the lower end of arm 21. The thermostat is thus relieved of strains. The heating circuit may be closed after the flatiron has cooled to the required extent by pressing the switch arm downward by means of a button 33 to such position that bar 20 springs upward in front of the lower end of arm 21, whereby the switch is secured in closed position, as shown in the drawing.

To provide for quick closing of the switch, the button 33 is rotatably mounted on a plunger 34 which is pressed upward by a helical spring 35. A lateral pin 36 is provided on the plunger, and this pin moves in a vertical slot 37 in the tubular guide 38 for the plunger. This slot 37 has a laterally extending inclined portion at its upper end into which the pin 36 is forced by the spring, the ends of the spring being secured to the plunger and guide 38 respectively under tension in such manner that the spring tends to rotate the plunger in the direction of the upper inclined portion of the slot, as well as force the plunger upward. It will thus be observed that the pin 36 rests normally on an inclined ledge formed by the lower edge of the inclined upper portion of slot 37. A considerable initial pressure must therefore be applied to the button 33 to move the pin 36 out of the upper inclined portion of the slot 37, whereupon the pin is free to move downward and the plunger thus suddenly released is therefore snapped downward quickly so that the switch arm is closed with a quick action.

The terminals 39 and 40 of the heating unit 12 are brought out at the rear of the pressure plate and are connected to external contact pins, not shown, which are mounted on the cover 15 in insulated relation therewith and protected by a plug guard 41 in a well known manner, the cut-out switch comprising bridging contacts 29 and 30, being included in the circuit with the heating unit.

An indicating member 42 is secured to the switch arm 26. This member has a flat upper surface which may be lettered "Off." When the switch arm 26 is thrown to open position the member 42 is carried upward near the cover 15 so that the signal can be read through an aperture in the cover, whereby the operator is given an indication that the heating circuit is open. When the switch arm is depressed to close the circuit, the signal disappears below the cover.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A temperature cut-out for electric heaters comprising a bimetallic thermostat, and a resilient member having substantially the same shape as said thermostat arranged in longitudinal engagement with said thermostat, and means for securing said thermostat and said resilient member together at one point, whereby the free ends of said thermostat and said resilient member may move in unison.

2. A temperature cut-out for electric heaters comprising a switch biased to open position, a bar thermostat, and a resilient bar normally securing said switch in closed position, said bar being arranged lengthwise of said thermostat so as to be bent by said thermostat to release said switch upon the occurrence of a predetermined temperature.

3. A temperature cut-out for electric heaters comprising a switch biased to open position, a bar thermostat, a resilient bar assembled on one side of said thermostat, and means for securing said thermostat and bar at one end, said bar having its free end arranged to hold said switch in closed position under normal temperature conditions but being bent by said thermostat to release said switch upon occurrence of a predetermined temperature.

4. A temperature cut-out for electric heaters comprising a bar thermostat, a resilient bar assembled lengthwise of said thermostat, means for securing said thermostat and said bar at one end, the free end of said bar projecting beyond the free end of said thermostat, and a switch normally held in closed position against the projecting end of said bar but released by the bending of said bar by said thermostat upon the occurrence of a predetermined maximum temperature.

5. A temperature cut-out for electric heaters comprising a switch biased to open position, a latch for holding said switch in closed position, a thermostat arranged to release said switch upon the occurrence of a predetermined temperature, a button arranged to be depressed to close said switch, and retarding means cooperating with said button so as to cause said button to be depressed with a snap action.

6. A temperature cut-out for electric heaters comprising a switch biased to open position, a latch for holding said switch in closed position, a thermostat arranged to release said switch upon the occurrence of a predetermined maximum temperature, and quick closing means for said switch comprising a plunger, a guide for said plunger provided with a slot having an upper inclined portion, a pin on said plunger moving in said slot, and a spring for biasing said plunger upward so that said pin lies in the inclined portion of said slot, whereby said plunger when depressed is initially retarded by said pin moving in the upper inclined portion of said slot and thereby caused to close said switch with a snap action.

In witness whereof, I have hereunto set my hand this 17th day of March, 1925.

WILLIAM D. KELLY.